US008866319B1

(12) United States Patent
Wiedemeier et al.

(10) Patent No.: US 8,866,319 B1
(45) Date of Patent: Oct. 21, 2014

(54) BUOYANCY ASSISTED MOTOR-GENERATOR

(71) Applicant: The United States of America as represented by the Secretary of the Navy, Washington, DC (US)

(72) Inventors: Brandon J. Wiedemeier, San Diego, CA (US); Jeffrey M. Lloyd, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/916,474

(22) Filed: Jun. 12, 2013

Related U.S. Application Data

(63) Continuation-in-part of application No. 13/110,212, filed on May 18, 2011, now abandoned.

(51) Int. Cl.
*F03G 7/08* (2006.01)
*H02K 7/18* (2006.01)
*F03B 17/04* (2006.01)

(52) U.S. Cl.
CPC ............... *H02K 7/1853* (2013.01); *F03B 17/04* (2013.01)
USPC ........................................................ 290/1 R

(58) Field of Classification Search
USPC .................. 290/1 R, 43, 54, 53; 60/398, 698; 180/165, 166, 65.31, 2.2; 318/376, 153
See application file for complete search history.

(56) References Cited

U.S. PATENT DOCUMENTS

2012/0169068 A1* 7/2012 Ervin ............................ 290/1 R

* cited by examiner

*Primary Examiner* — Tulsidas C Patel
*Assistant Examiner* — Viet Nguyen
(74) *Attorney, Agent, or Firm* — SPAWAR Systems Center Pacific; Kyle Eppele; Peter A. Lipovsky

(57) ABSTRACT

A pair of reverse-scissoring arms are configured to be rotatable and reverse-scissorable about a common central axis point. A volume expandable and volume contractible truck is operably disposed at each of the distal ends of the reverse-scissoring arms. Actuation of the arms simultaneously expands one of the trucks, increasing its volume, while contracting the other of the trucks, decreasing its volume. Operably coupled to each of the reverse-scissoring arms is an energy-supplied electric motor-generator. Energization of the motors actuates the arms, whereas actuation of the arms without energization of the motors generates electrical power in the motors. When submersed in liquid, the simultaneous expansion and contraction of the volume in the trucks generates positive and negative buoyancy, respectively, enhancing the dynamics of the truck expansion/contraction motion and the reverse scissorable arm actuation.

7 Claims, 3 Drawing Sheets

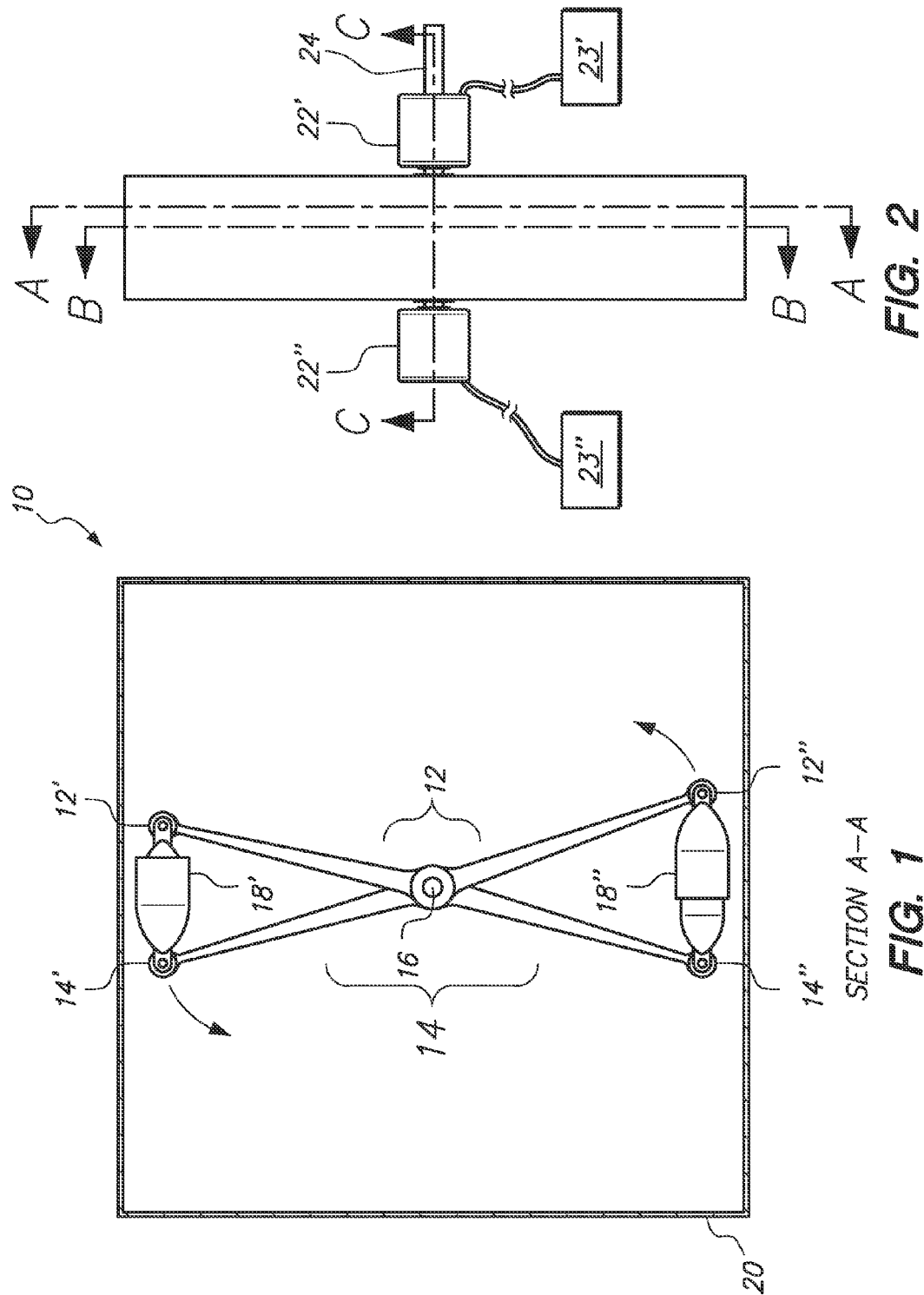

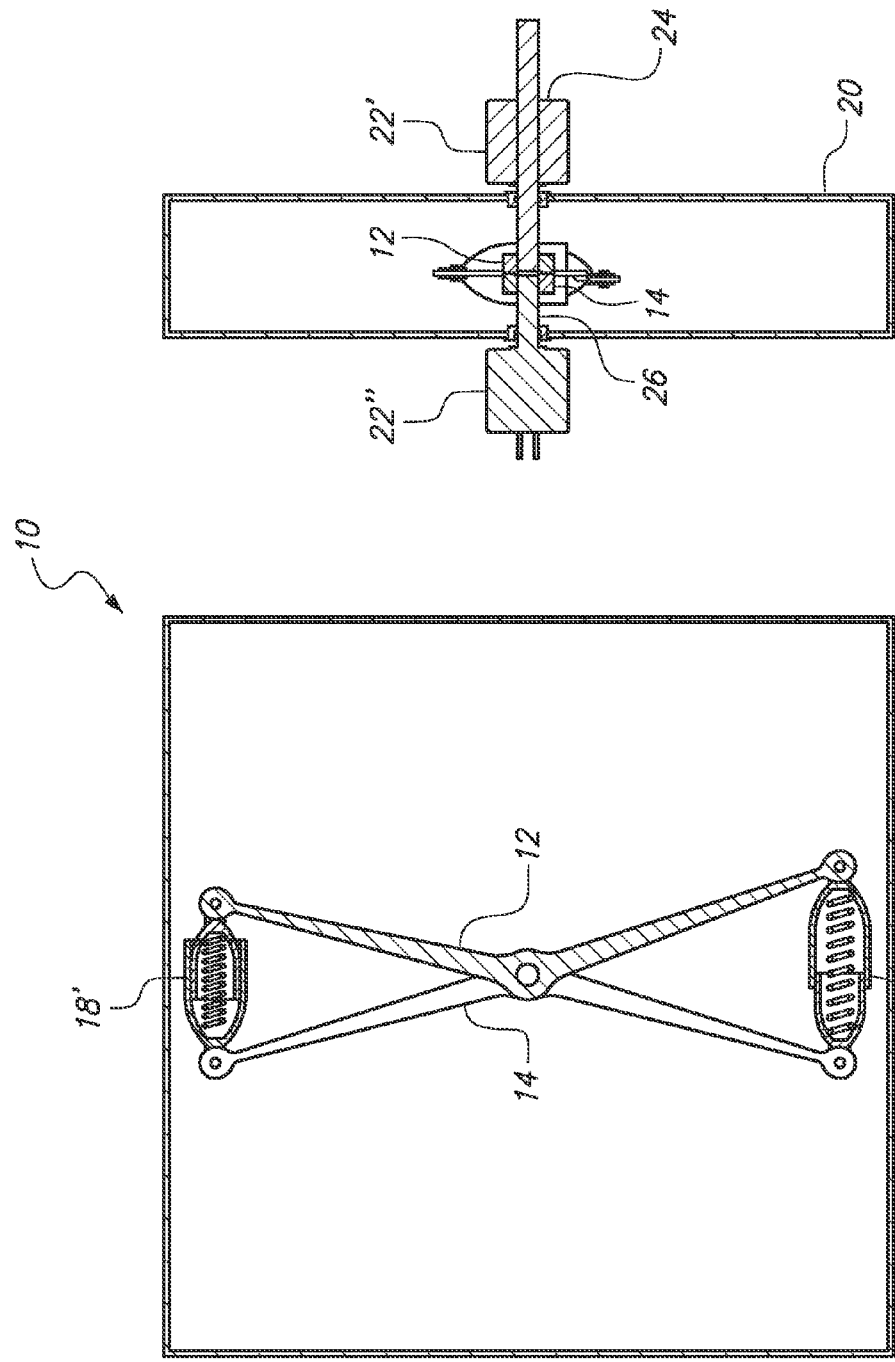

US 8,866,319 B1

BUOYANCY ASSISTED MOTOR-GENERATOR

REFERENCE TO PRIOR APPLICATION

This application is a continuation-in-part of prior application Ser. No. 13/110,212 filed 18 May 2011, the latter application incorporated by reference herein in its entirety.

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Please reference Navy Case No. 102591.

BACKGROUND

In applications involving a rotating mass, it is realized that in some instances, buoyancy can be utilized to enhance the rotating mass dynamics. In certain cases it is desirable to simultaneously use both positive and negative buoyancy effects to assist in such dynamic enhancement.

SUMMARY

A pair of reverse-scissoring arms is configured to be rotatable and reverse-scissorable about a common central axis point. A volume expandable and volume contractible truck is operably disposed at each of the distal ends of the reverse-scissoring arms. Actuation of the arms simultaneously expands one of the trucks, increasing its volume, while contracting the other of the trucks, decreasing its volume. Operably coupled to each of the reverse-scissoring arms is an energy-supplied electric motor-generator. Energization of the motors actuates the arms, whereas actuation of the arms without energization of the motors generates electrical power in the motors. When submersed in liquid, the simultaneous expansion and contraction of the volume in the trucks generates positive and negative buoyancy, respectively, enhancing the dynamics of the truck expansion/contraction motion and the reverse scissorable arm actuation.

BRIEF DESCRIPTION OF THE DRAWINGS

FIG. 1 is a first partially sectioned side view of one embodiment of the buoyancy assisted motor-generator as further described herein.

FIG. 2 is an illustration of a top view of the embodiment of the buoyancy assisted motor-generator shown in FIG. 1 with section lines shown.

FIG. 3 is a second partially sectioned side view of the embodiment of the buoyancy assisted motor-generator as shown in FIG. 1.

FIG. 4 shows a sectioned top-view of the embodiment of the buoyancy assisted motor-generator shown in FIG. 1.

DETAILED DESCRIPTION

Figure 5:
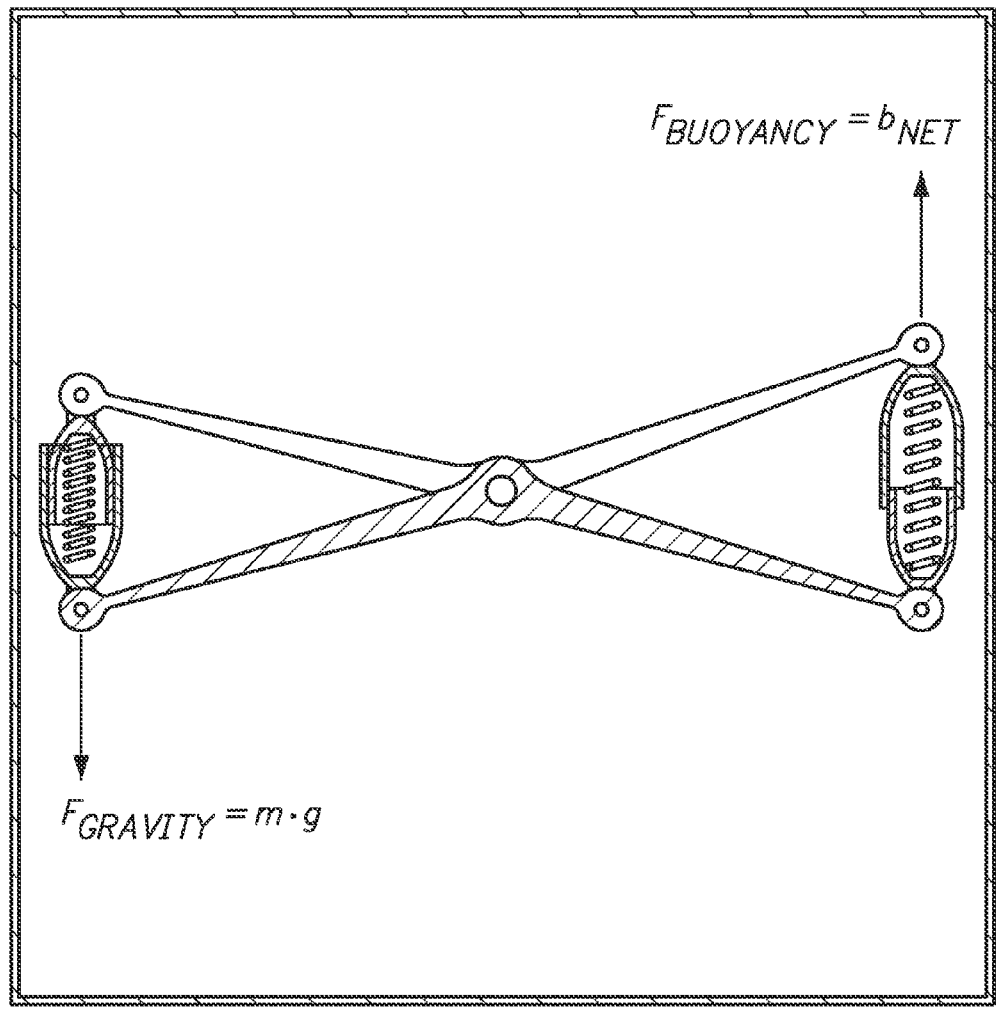
FIG. 5 is a partially sectioned side view of the buoyancy assisted motor-generator as further described herein depicting forces affecting its operation.

An aspect of the buoyancy assisted motor-generator as described herein is a transfer of energy between a compressed-negatively buoyant body and an expanding-positively buoyant body.

Referring now to FIG. 1, there is shown a buoyancy assisted motor-generator apparatus 10 according the description herein. Apparatus 10 includes a pair of reverse-scissoring arms, 12 and 14, that are rotatable and reverse-scissorable about a common central axis 16. Arms 12 and 14 have distal ends, 12', 12" and 14', 14" that, when moved relative to each other, provide a reverse scissoring motion, i.e. 12' and 14' will converge and 12" and 14" will diverge and vice-versa.

Between the distal ends of arms 12 and 14, and operably coupled thereto such as by the pivots shown, are individual trucks, 18' and 18", each of which are expandable and contractible. The expansion of one truck leads to the contraction of the other and vice-versa. And, as a direct consequence, the following change in volume is used as a buoyancy differential in the sense that one truck becomes positively buoyant and the other negatively buoyant as will be further described.

Arms 12 and 14 and trucks 18' and 18" are shown enclosed, in this example, within a liquid sealed enclosure 20, shown from a different perspective in FIG. 2.

In FIG. 2, a top view of this particular example of the buoyancy assisted motor-generator 10 is shown. FIG. 2 shows sectional lines as used in this description. Additionally, there is shown in FIG. 2 two motor-generators, 22' and 22" that are individually operably coupled to 12 and 14, respectively. Operation of the motors will be further described, however it should be noted that the motors 22 and accompanying energization sources 23 may be placed external or internal to enclosure 20 or even a combination of these. Energization sources, 23' and 23", such as batteries, photovoltaic sources, capacitors and the like are operably coupled to motor-generators 22' and 22", respectively, to provide a source of power to urge the motion of arms 12 and 14. Also shown in this figure is an output shaft 24 wherefrom the buoyancy enhanced motion of apparatus 10 can be coupled to another rotating mass.

The motor/generators function in three ways. They provide support of the shafts attached to the reverse-scissoring arms. They permit transfer energy out of the system as electrical generators. They support the movement of the expansion/compression cycles in a motor function as will be further explained.

Referring now to FIG. 3, a partial section of apparatus 10 is shown along sectional lines B-B depicted in FIG. 2. Arms 12 and 14 are shown to be readily distinguishable in this sectional. Additionally distinguishable are the inner workings of example trucks 18' and 18". The design function of truck 18 is to enable an increase and decrease in volume as occupied by the trucks. The trucks shown are pivotally coupled to the reverse-scissoring arms to allow a reciprocating motion between individual male/female compatible shells. The shells have a sufficient sealing surface therebetween to enable storage of gas within the shells. Air, Oxygen, dry Nitrogen or a Noble gas can be used within the trucks and in instances where springs are employed within the truck the trucks can be under a vacuum. Having a compressed gas equal to or greater than the exterior hydraulic pressures expected will assist in keeping the trucks from flooding and simplifies the sealing of the truck male/female surfaces. The motion of arms 12 and 14 cause a reciprocating movement of the shells with respect to each other, preserving a sealing capability while in motion or static. Additionally illustrated are springs within the truck shells. The springs, while optional, should be chosen so that they are substantially equal for truck 18' as for truck 18".

Referring now to FIG. 4, a cross-sectioned top view of the buoyancy assisted motor-generator is shown wherein a split shaft arrangement (shafts 24 and 26) is employed. The split shaft arrangement is such that each shaft is operably attached to its own reverse-scissoring arm. Here, in this example, shaft 24 is coupled to arm 12 while shaft 26 is coupled to arm 14. The effect of this split coupling allows motor-generators 22' and 22" to be employed independently (these motors shown with simple cross-sectioning for ease of illustration). The use of the motor-generators in this fashion allows for an initialization of the buoyancy assisted apparatus from a static to dynamic state. As previously mentioned, motors 22 and their accompanying energization sources 23 may be mounted externally to enclosure 20 or may be positioned internal to enclosure 20 or a combination of internal and external configurations. In either case, the motor shafts are appropriately sealed when permeating the enclosure.

Referring now to FIG. 5, motor-generators 22' and 22" of FIG. 4 incorporate timing controls to enable them to promote the initial expansion and contraction of the trucks. As the trucks pass 0 and 180 degrees, the angular motion of their center of mass remains constant but the trucks are physically changing shape by a few degrees of arc as they pass. The motor function of the motor-generators is used to coordinate this transition. Relatively speaking, one motor will move slightly faster, with respect to the other motor, during the 0 degree (Top Dead Center) and 180 degree (Bottom Dead Center) transitions. Specifically, the motor attached to the arm that is leading at the compression side will slow (relatively) twice a revolution (every 180 degrees), once for each truck as the truck passes TDC. The other motor, attached to the other truck, will speed up (relatively) at the same time. The coordination of the motors effectuates a compression of the moving truck travelling through TDC while at the same time expands the moving truck travelling through BDC.

FIG. 5 illustrates the significant forces present upon the trucks in their movement from BDC to TDC and in turn from TDC to BDC. Each truck when compressed at the top of motion becomes denser than the surrounding liquid and is pulled by gravity with a total potential energy:

$$E_{GRAVITY} = m \cdot g \cdot h$$

Wherein:
m=the net mass of the compressed truck, g=gravity and h=the potential height that is the total height the center of mass of the truck travels from TDC to BDC.

Each truck then passes the bottom of motion and is expanded, at this point the truck is less dense than the liquid it is immersed in and is pulled up by net buoyancy with a total potential energy:

$$E_{BOUYANCY} = b_{NET} \cdot h$$

NetPower=$(E_{GRAVITY}+E_{BUOYANCY}$–Friction–Drag–NetTruck Compression)·# of cycles/time Wherein:
bNET=net buoyancy, Egravity=total potential energy from gravity and Ebouyancy=the weight of the water that the expanded truck displaces minus the dry weight of the truck. The gross energy required to compress the expanded truck at TDC is greater than the energy generated by gravity and buoyancy. Therefore the energy stored in the compressed truck at BDC must be conserved, as the energy stored in the compressed truck is transferred to the truck at TDC. The energy stored in the compressed truck is designed to be approximately enough to expand the truck at BDC and help to compress the truck at TDC.

At the time of compression, additional power is needed and the additional energy is added to the system through the two opposing motors. As the compression begins, the trailing linked motor at TDC starts to apply additional rotation energy. Simultaneously, the leading linked motor at TDC applies counter-rotation energy as needed to the other to move the arms appropriately.

As the cycle progresses, the energy stored in the compressed truck is transferred mechanically as it expands to promote compression of the uncompressed truck. The truck expansion/compression combined with momentum permits a cyclical application of the apparatus.

In applications where it is desired to assist a perpetuation of a rotating mass, much like the function of a flywheel of an internal combustion engine, the buoyancy assisted motor-generator can be linked to the rotating mass and effectuate a buoyancy/gravity driven flywheel equivalent.

It is to be understood that many additional changes in the details, materials, steps and arrangement of parts, which have been herein described and illustrated to explain the nature of the invention by way of example, may be made by those skilled in the art within the principle and scope of the invention as expressed in the appended claims.

What is claimed is:

1. An apparatus comprising:
a pair of reverse-scissoring arms, said arms being rotatable and reverse-scissorable about a common central axis point;
a pair of volume expandable and volume contractible trucks, one of said trucks operably disposed at each of the distal ends of said reverse-scissoring arms whereby actuation of said arms simultaneously expands one of said trucks increasing its volume while contracting the other of said trucks decreasing its volume;
a pair of electric motor-generators, one of said electric motor-generators operably coupled to each of said reverse-scissoring arms; and
a pair of stored-power energization sources, one of said energization sources operably coupled to each of said electric motor-generators
so that energization of said electric motors-generators by said stored-power energization sources actuates said arms whereas actuation of said arms without energization of said motors generates electrical power in said motors.

2. The apparatus of claim 1 wherein said trucks each include an interiorly disposed spring in alignment with said expansion-contraction of said trucks, said springs being substantially equal.

3. The apparatus of claim 1 wherein said trucks each contain a gas, said gas in each truck being equal under equal conditions.

4. An apparatus comprising:
a pair of reverse-scissoring arms, said arms being rotatable and reverse-scissorable about a common horizontally disposed central axis point;
a pair of volume expandable and volume contractible trucks, one of said trucks operably disposed at each of the distal ends of said reverse-scissoring arms whereby actuation of said arms simultaneously expands one of said trucks increasing its volume while contracting the other of said trucks decreasing its volume;
a pair of stored-power energization sources;
a pair of electric motor-generators, one of said electric motor-generators operably coupled to each of said reverse-scissoring arms and one of said stored-power energization sources operably coupled to each of said electric motor-generators so that energization of said motors by said stored-power energization sources actuates said arms whereas actuation of said arms without energization of said motors generates electrical power in said motors; and a liquid medium, wherein said trucks are disposed within said liquid medium so that one truck begins to rise in depth in said liquid medium when said reverse scissor-arms are actuated and the other said truck begins to fall in depth in said liquid medium when said reverse-scissor arms are actuated.

5. The apparatus of claim 4 wherein said trucks each include an interiorly disposed spring in alignment with said expansion-contraction of said trucks, said springs being substantially equal.

6. The apparatus of claim 4 wherein said trucks each contain a gas, said gas in each truck being equal under equal conditions.

7. An apparatus comprising:
- a pair of reverse-scissoring arms, said arms being rotatable and reverse-scissorable about a common horizontally disposed central axis point;
- a pair of volume expandable and volume contractible trucks each truck of which is filled with a gas that is equal under equal conditions, one of said trucks operably disposed at each of the distal ends of said reverse-scissoring arms whereby actuation of said arms simultaneously expands one of said trucks increasing its volume while contracting the other of said trucks decreasing its volume;
- a pair of stored-power energization sources;
- a pair of electric motor-generators, one of said electric motor-generators operably coupled to each of said reverse-scissoring arms and one of said stored-power energization sources operably coupled to each of said electric motor-generators so that energization of said motors by said stored-power energization sources actuates said arms whereas actuation of said arms without energization of said motors generates electrical power in said motors; and
- a liquid medium, wherein said trucks are disposed within said liquid medium so that one truck begins to rise in depth in said liquid medium when said reverse scissor-arms are actuated and the other said truck begins to fall in depth in said liquid medium when said reverse-scissor arms are actuated.

* * * * *